No. 821,104. PATENTED MAY 22, 1906.
E. KATZINGER.
BAKING PAN.
APPLICATION FILED NOV. 7, 1904.
2 SHEETS—SHEET 1.
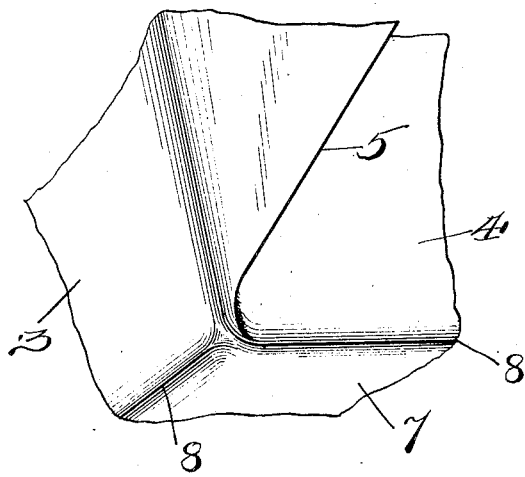
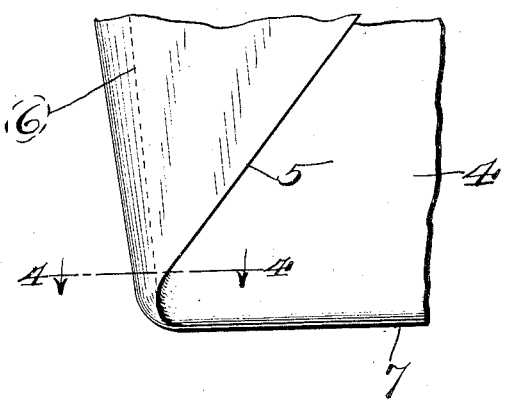
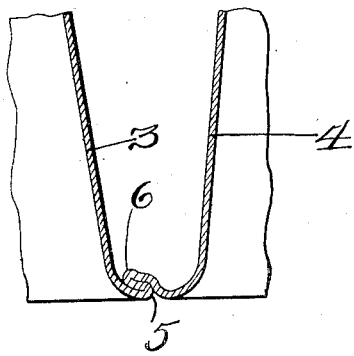
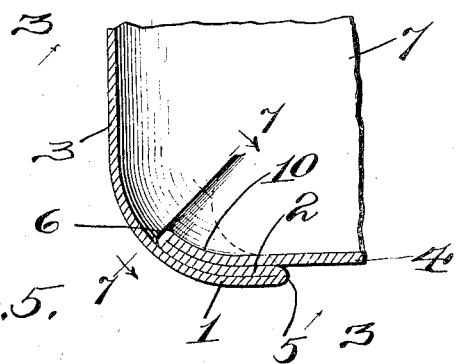
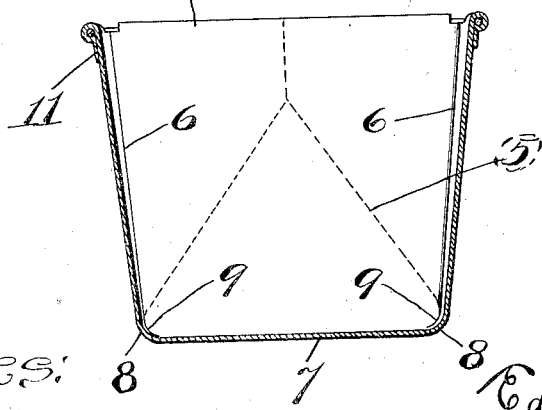
Witnesses:
J. B. Weir
Robert K. Weir
Inventor:
Edward Katzinger
by Elliott & Hopkins
Attys No. 821,104. PATENTED MAY 22, 1906.
E. KATZINGER.
BAKING PAN.
APPLICATION FILED NOV. 7, 1904.
2 SHEETS—SHEET 2.
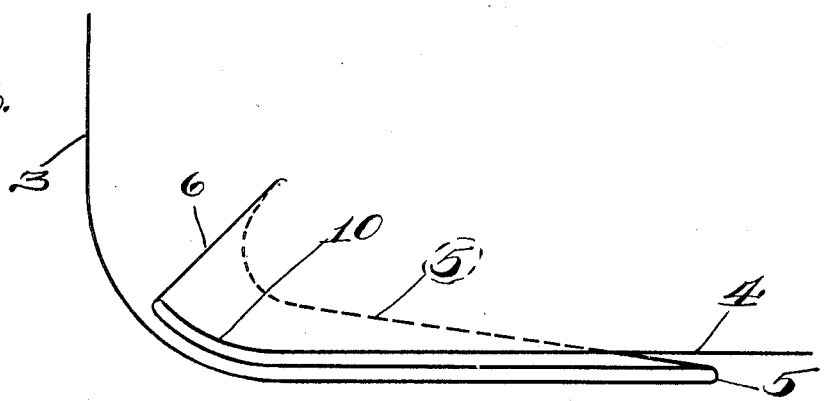
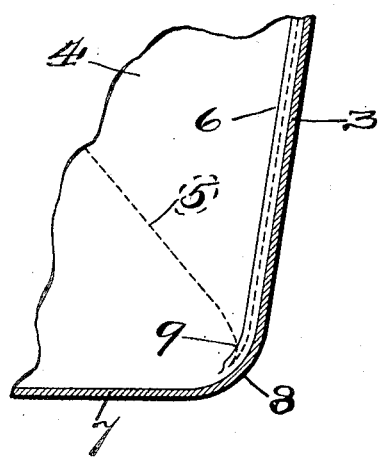
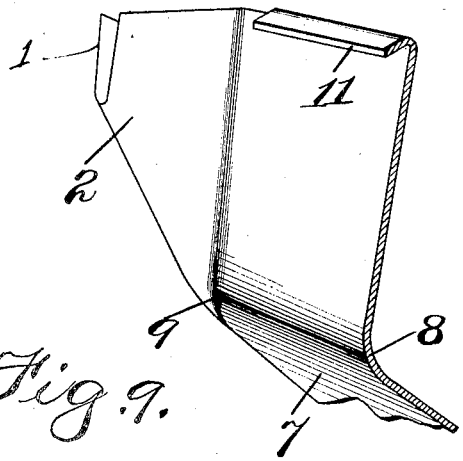
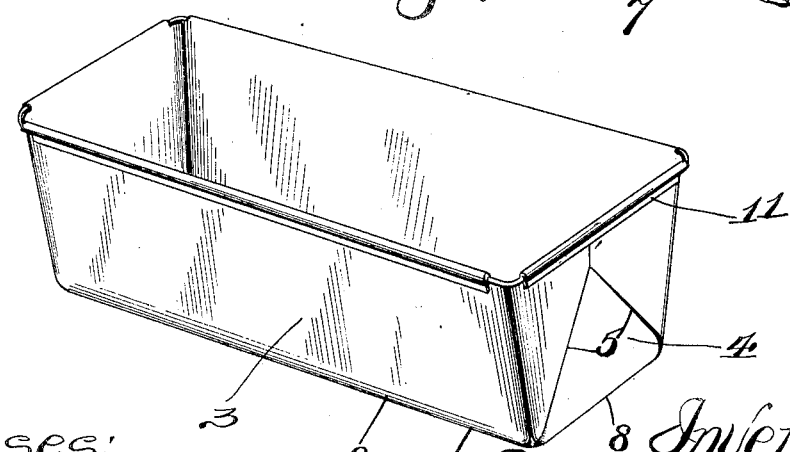
Witnesses:
J. B. Weir
Robert H. Weir
Inventor:
Edward Katzinger
by Elliott + Hopkins
attys

UNITED STATES PATENT OFFICE.

EDWARD KATZINGER, OF CHICAGO, ILLINOIS.

BAKING-PAN.

No. 821,104.　　　Specification of Letters Patent.　　　Patented May 22, 1906.

Application filed November 7, 1904. Serial No. 231,626.

*To all whom it may concern:*

Be it known that I, EDWARD KATZINGER, a citizen of the United States, residing as Chicago, in the county of Cook and State of Illinois, have invented certain new and useful Improvements in Baking-Pans, of which the following is a full, clear, and exact specification.

My invention relates to pans generally, but more particularly to pans employed for baking purposes and other like uses; and it has for its primary object to provide a pan with a concavo-convex corner and rounded edges at the bottom of such a construction that the corner may be produced from thin sheet metal of a low grade incapable of standing any considerable degree of drawing. The object of having such a corner on a pan is too obvious to require explanation; but it might be briefly stated that with a pan of this form not only the liability of damage from the peel in the attempts of the baker to insert it under the pan are reduced to the minimum, and the life of the pan thereby prolonged, but the interior is kept free from crevices, indentations, and sharp corners which hold particles of the loaf, and thus not only make the pan difficult to clean, but disfigures the loaf, and in addition to these advantages of the concavo-convex corner and the rounded edges of the pan at the bottom is the other important advantage of being more readily nested and not so liable to cling or jam together when nested. To form this desired concavo-convex corner on a pan produced from stout stock or the higher grades of metal that will allow of the requisite amount of drawing might be comparatively simple, but when an attempt is made to produce this corner by partially folding and partially drawing the metal or wholly by the latter method the stock breaks or tears, and therefore in order that I may use the lower grades of stock, which should be used to make an inexpensive article, I employ a novel form and arrangement of folds for producing the concavo-convex corner.

With these ends in view the invention consists in certain features of novelty in the form, construction, arrangement, and combination of parts or features whereby the said objects and certain other objects hereinafter appearing are attained, all as fully described with reference to the accompanying drawings, and more particularly pointed out in the claim.

In the said drawings, Figure 1 is a perspective view of one end of a pan constructed according to my invention. Fig. 2 is an enlarged end elevation of one corner thereof. Fig. 3 is a transverse section on line 3 3, Fig. 4. Fig. 4 is a plan section taken on the line 4 4, Fig. 2. Fig. 5 is a cross-section of the complete pan. Fig. 6 is an enlarged and exaggerated diagram showing the plan of the folds. Fig. 7 is a vertical section taken on line 7 7, Fig. 4, at the edge of the inner fold and extending through the center of the corner in a plane radial to the corner of the pan. Fig. 8 is a perspective view of one corner of the blank before the latter is folded around against the wall of the pan to produce the concavo-convex corner. Fig. 9 is a perspective view of a pan constructed according to the principles of this invention.

The method of producing the concavo-convex corner shown and described herein constitutes the subject-matter of a separate application filed September 22, 1904, Serial No. 225,431; but such method may be briefly referred to herein for the purpose of giving an adequate understanding of the final result or construction. In producing the concavo-convex corner the blank from which the pan is formed is formed with a projecting flap extending radially from the corner of the pan and comprising two plies or thicknesses 1 2, each of which is a continuation of one of the walls 3 4 of the pan and which conjoin with each other at their outer edges and form a triangle with the sides of the pan and with one of its corners situated at the lower corner of the pan where the concavo-convex corner is to be produced. Where the outer edges of these plies 1 2 come together, a fold 5 is formed, which will be hereinafter referred to as the "outer" fold, and where the inner edge of the ply 2 adjoins the wall 4 a fold 6 is formed, and this will be hereinafter referred to as the "inner" fold, the line of the outer fold 5 and that of the inner fold 6 naturally coming together or meeting at the lower corner of the triangle, and this point of conjunction is situated at or about the center of the concavo-convex corner produced on the pan. The pan is also rounded at its lower edges or along the lines where the bottom 7 adjoins the walls 3 4, as shown at 8. This rounding 8 is of a cylindrical formation, and it merges into the concavo-convex formation of the corner, and consequently the fold 6 at its lower end is curved, as shown at 9, to conform to this cylindrical formation 8 on one side. After the blank is thus formed with the projecting flap 1 2 the flap is folded over against the wall 4 in such a way that the fold 6 will be sharply creased throughout its entire extent from the extreme lower end or center of the concavo-convex corner to the top of the pan, and which crease extends upwardly along the line of conjunction between the walls 3 4 of the pan in substantially a straight line after passing the curve 9, so that considered in plan view this inner fold 6 while conforming at its lower end to the contour of the concavo-convex corner extends across said corner in a direction radial thereto, while the outer fold 5, although starting at the same point at its lower end as the inner fold 6, crosses to the right of the inner fold and extends in a substantially spiral form at its lower end and thence upwardly in an inclined straight direction across the outer face of the wall 4, always tending in a direction away from the inner fold 6, this spiral formation of the lower end of the outer fold 5 being necessary in order to make the fold conform to the convex surface of the corner of the pan and at the same time have the flap lie flat against the wall. Before the flap is thus folded against the wall, however, and in order that the upright corner of the pan around which the flap is turned may also be cylindrical and merge gradually into the concavo-convex corner at the bottom one wall of the pan—the wall 4, against which the flap is folded—is given a cylindrical formation 10, with the axis of the cylinder vertical or upright where the wall 4 adjoins the fold 6, the cylinder 8 being merged into the cylinder 10 by pressure of the dies or other suitable means, so that when the flap is folded flat against the wall 4 it will conform also to the cylindrical surface 10 and produce the rounded or cylindrical upright corner. After the flap 1 2 is thus folded in place against the wall 4 it is secured in any suitable way well known in the art—such, for example, as a flange 11, turned downwardly against the upper edge of the flap at each end of the pan, as better shown in Fig. 9. With a corner thus constructed it will be seen that I am enabled to produce the concavo-convex formation without any material degree of drawing, the entire construction or formation being the result of the particular form or construction of the folds and their arrangement and relation to the other features, and consequently I am enabled to produce a pan of a very desirable form or construction from a low grade of stock incapable of standing the material degree of drawing or stamping that would be required to produce this formation by the drawing method.

Having thus described my invention, what I claim as new therein, and desire to secure by Letters Patent, is—

As a new and useful article of manufacture a pan provided with a concavo-convex corner having two folds and in which one fold of the metal on the inside extends from the bottom of the pan at or about the center of such corner, radially or outwardly, conforming to the concave surface of the corner and thence upwardly along the upright corner formed by the contiguous sides of the pan; and the outer fold of the metal extends from a point at the bottom of the pan at or about the center of such corner, upwardly and spirally toward the opposite side of the pan and conforming to the convex surface of the corner, one wall of the pan having a sharp inward curve with its axis upright, terminating at the apex of the said inner fold and which inward curve is crossed in a spiral direction by the apex of the outer fold, and the outer ply of the outer fold being a continuation of the contiguous wall of the pan and extending in an out curve around the said curved part of the first said wall.

EDWARD KATZINGER.

Witnesses:
FRANCIS A. HOPKINS,
M. B. ALLSTADT.